(No Model.)
H. M. BYLLESBY
ARMATURE FOR DYNAMOS AND MOTORS.
No. 383,617. Patented May 29, 1888.
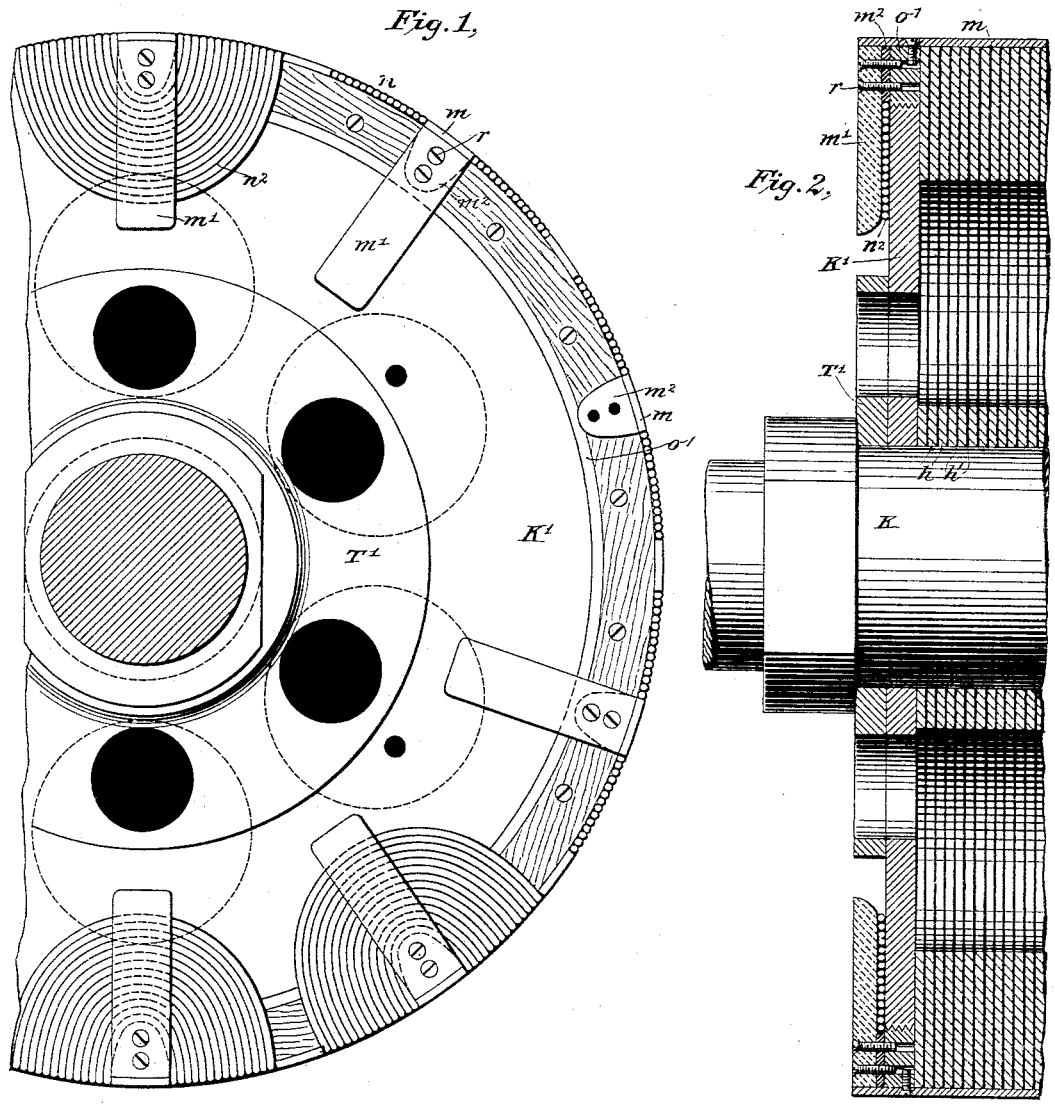

UNITED STATES PATENT OFFICE.

HENRY M. BYLLESBY, OF PITTSBURG, PENNSYLVANIA, ASSIGNOR TO THE WESTINGHOUSE ELECTRIC COMPANY, OF SAME PLACE.

ARMATURE FOR DYNAMOS AND MOTORS.

SPECIFICATION forming part of Letters Patent No. 383,617, dated May 29, 1888.

Application filed September 1, 1887. Serial No. 248,474. (No model.)

*To all whom it may concern:*

Be it known that I, HENRY M. BYLLESBY, a citizen of the United States, residing in Pittsburg, in the county of Allegheny, in the State of Pennsylvania, have invented certain new and useful Improvements in Armatures for Electric Machines, of which the following is a specification.

The invention relates to the construction of armatures for electric machines. In constructing armatures for a certain class of electric generators it is customary to wind the coils across the face of the armature and down upon the ends, the portions lapping over the ends being held by overhanging clips. These clips have been made of such materials as vulcanized fiber and wood. In the present invention it is proposed to make them of glass, the superior insulating qualities of which are well recognized. To obviate the danger of their being broken were they to be fastened against a metallic portion of the armature itself, they are preferably bound against small packing-lugs of softer material—for instance, vulcanized fiber or leatheroid. These packing-lugs serve to hold the clips out from the armature and allow the space necessary for the wires to pass beneath the clips.

In the accompanying drawings, Figure 1 is an end view, partly in section, of a portion of the armature; and Fig. 2 is a cross-section of a portion.

Referring to the figures, K represents a shaft upon which the armature is carried. It is constructed from thin plates $h\,h$ of soft iron, separated by sheets $h'$ of non-conducting material. These are bound upon the shaft by end plates, $K'$ and $T'$, and the plates $K'$ are provided with rings $o'$, which are preferably of brass. These rings screw upon the periphery of the plates $K'$.

The periphery of the armature is provided with strips $m$, which constitute non-magnetic lugs, about which are wound the coils $n$ of the armature. These coils are carried down upon the end of the armature, as shown at $n^2$. They are fastened or held in position beneath overhanging clips $m'$, placed at the ends of the respective strips $m$. These overhanging clips are of glass, and thus serve excellently well as insulators. For the purpose of insuring, however, that they shall not be broken by being fastened directly against the brass or metallic ring $o'$, or by the expansion and contraction due to changes in temperature, small packing-lugs $m^2$ are placed between the clips and the ring, and the screws $r$, which bind the clamps in position, pass through these packing-lugs. The packing-lugs may be of vulcanized fiber or leatheroid or other suitable non-frangible insulating material, and they are of such thickness as to allow the wire to pass between the clips and the end plates of the armature in the manner shown.

I claim as my invention—

1. In an electric machine, the combination, with the armature-core and wires wound upon the face thereof and down upon the ends, of overhanging clips of glass beneath which the wires upon the ends of the armature pass.

2. In an electric machine, the combination, with the armature-core, end plates therefor, and rings of metal at the outer ends or corners of the core, of wires wound upon the face thereof and down upon the ends, overhanging clips of glass beneath which the wires upon the ends of the armature pass, and lugs of non-frangible non-conducting material intervening between the metallic end rings of the armature-core and the overhanging clips, substantially as described.

In testimony whereof I have hereunto subscribed my name, this 1st day of July, A. D. 1887.

HENRY M. BYLLESBY.

Witnesses:
W. D. UPTEGRAFF,
CHARLES A. TERRY.